United States Patent Office 3,806,507
Patented Apr. 23, 1974

3,806,507
CHLOROCYANURIC ACID MANUFACTURE
Duane L. Sawhill, Orange, Conn., assignor to
Olin Corporation
No Drawing. Filed July 20, 1972, Ser. No. 273,656
Int. Cl. C07d 55/42
U.S. Cl. 260—248 C                    9 Claims

ABSTRACT OF THE DISCLOSURE

Chlorocyanuric acids are produced by combining (1) an aqueous slurry of cyanuric acid with (2) an aqueous solution of a hypochlorite of an alkali metal or alkaline earth metal and (3) an aqueous acid stronger than hypochlorous acid, maintaining a pH below 5 in the resulting aqueous mixture.

---

Dichlorocyanuric acid, and its salts, as well as trichlorocyanuric acid are well known products of commerce finding wide use in washing, bleaching, cleansing and sanitizing applications. The common commercial batch manufacturing process for the trichlorocyanuric acid (TCCA) is introducing gaseous chlorine into a solution of trisodium cyanurate with good mechanical agitation to a pH of 4.5 or below. In a continuous process, gaseous chlorine and a solution of trisodium cyanurate are fed simultaneously into a reaction zone maintained at 4.5 pH or below. In either case the reaction temperature is not particularly critical but is usually maintained at 25±15° C. Dichlorocyanuric acid (DCCA) is made similarly, batchwise or continuously, except that the cyanuric acid (CA) is fed to the reaction as its dibasic salt of sodium, potassium, calcium or other alkali or alkaline earth metal rather than as its tribasic salt.

Australian Pat. 219,930 issued Nov. 15, 1956 discloses the use of sodium hypochlorite to prepare dichlorocyanuric acid by chlorinating cyanuric acid.

Canadian Pat. 672,498 discloses preparing dichlorocyanuric acid by chlorinating a solution of cyanuric acid in 3 to 5 mols of sodium hydroxide to a pH of 5 to 8 and then acidifying to pH 1 to 3 by adding $H_2SO_4$ or other strong mineral acid. Run 10 shows that chlorinating to pH 4.3 causes formation of some trichlorocyanuric acid.

U.S. Pat. 3,668,204 issued June 6, 1972, claims preparing chloroisocyanuric acids by chlorinating cyanuric acid with sodium hypochlorite and chlorine. The cyanuric acid and sodium hypochlorite are combined and then chlorinated or all three are combined simultaneously.

In the method of the present invention, chlorocyanuric acid is produced by reacting simultaneously (1) an aqueous slurry of cyanuric acid
(2) an aqueous solution of a hypochlorite selected from the group consisting of alkali metal hypochlorites and alkaline earth metal hypochlorites and
(3) an aqueous acid stronger than hypochlorous acid, maintaining a pH below 5 in the resulting aqueous mixture, and recovering the chlorocyanuric acid produced thereby.

One advantage of this process is that this commercial preparation of aqueous hypochlorite solutions is well known to the art. The evolved heat is easily removed from alkaline solutions in simple heat exchangers without the clogging or scaling encountered using slurries. The process is easily and closely controllable.

Another advantage of the process of the present invention is that in the acid solutions used, less of the explosive $NCl_3$ by-products is formed than in alkaline solutions.

Another advantage of this invention is that dilute waste streams containing chlorine are suitably scrubbed with alkalies to recover the chlorine as hypochlorite which is used in the present process. Other and further advantages appear in the accompanying description.

A further advantage is that the process of this invention is suitably operated continuously. The reactions are rapid and no long holding times are required. Batch operations are also simple and convenient.

In the method of this invention, the amount of alkali metal or alkaline earth metal hypochlorite is sufficient, when reacted with the strong acid, to provide a molar ratio of hypochlorous acid to cyanuric acid of about 1.8:1 to 2.2:1 when dichlorocyanuric acid is the desired product and about 2.8:1 to 3.2:1 when trichlorocyanuric acid is the desired product. Equations representing the course of the reactions in this process are:

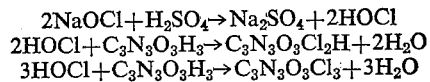

$$2NaOCl + H_2SO_4 \rightarrow Na_2SO_4 + 2HOCl$$
$$2HOCl + C_3N_3O_3H_3 \rightarrow C_3N_3O_3Cl_2H + 2H_2O$$
$$3HOCl + C_3N_3O_3H_3 \rightarrow C_3N_3O_3Cl_3 + 3H_2O$$

Nearly stoichiometric proportions are suitably used. The preparation of alkali metal and alkaline earth metal hypochlorites is well known to the art. At pH below 5, the HOCl formed in the presence of the cyanuric acid reacts to form the desired dichlorocyanuric acid or trichlorocyanuric acid. Alkali metal or alkaline earth metal salt of the strong acid remains in solution. Recovery of the product is a simple separation, suitably by centrifuging or filtering of the undissolved chlorocyanuric acid product from the solution, washing and drying.

Any of the alkali metal or alkaline earth metal hypochlorites are suitable, for example, potassium hypochlorite or calcium hypochlorite, although sodium hypochlorite is more easily prepared and is satisfactory.

Temperatures below 40° C. are suitable although temperatures of about 25±15° C. are preferred. Temperatures of 0° or slightly lower are suitable.

Any of the acids stronger than hypochlorous acid are suitable for acidifying the sodium hypochlorite including, for example, sulfuric, phosphoric, nitric, hydrochloric and others resistant to hypochlorite oxidation. Preferably hydrochloric acid is used with calcium hypochlorite to avoid any problems due to precipitation of insoluble calcium salt by-products.

The amount of water is advantageously limited to reduce solubility losses of the product and to avoid handling uneconomical quantities of aqueous liquors, avoiding the precipitation of by-products salts, especially at low temperatures. Suitable sodium hypochlorite solutions contain from 50 to 250 grams per liter, more or less. The acid is also suitably moderately concentrated, from 1 to 20 normal, more or less.

EXAMPLE I

A slurry of 38.7 g. (0.3 mol) of cyanuric acid in 350 ml. of water was placed in a one liter beaker. The beaker was provided with a water-ice bath, pH electrodes, and a magnetic mixer. Strong NaOCl liquor containing 183.5 g.p.l. of available chlorine and a solution of 10 N $H_2SO_4$ were dripped into the stirred slurry. The rates of addition were adjusted so as to maintain a pH of 3.5±0.5 in the slurry. The reaction temperature was held at 15±2° C. Total reaction time was 80 minutes. The reaction was very placid, little foaming occurred, and no odor of $NCl_3$ over the reaction vessel was detected. A total of 378 ml. of the NaOCl liquor (0.97 mol of NaOCl) and 115 ml. (1.15 mols) of the $H_2SO_4$ were used.

The finished product was filtered on a coarse fritted filter, washed with 30 ml. of ice water and vacuum dried for 1.5 hours at 110° C. The resulting trichlorocyanuric acid weighed 66.3 g. (95.0 percent yield) and assayed 89.0 percent available chlorine (97.5 percent of theoretical).

EXAMPLE II

A one liter beaker was provided with a water-ice bath, pH electrodes, a magnetic mixer and an overflow pipe installed at the 100 ml. volume level.

The cyanuric acid was finely ground and 38.7 g. (0.3 mol) was suspended in 250 ml. of water. This slurry, kept suspended by vigorous agitation, was fed by syphon into a heel of 100 ml. of water placed in the beaker. Into the slurry was dripped strong NaOCl liquor containing 183.5 g.p.l. of available chlorine, the cyanuric water slurry and 10 N $H_2SO_4$. The rates of addition were adjusted to hold the pH of the reaction mixture at 3.5–0.5. The reaction temperature was held at 15±2° C. The total reaction time was 65 minutes. The reaction was very placid, little foaming occurred and no odor of $NCl_3$ over the reaction vessel was detected. A total of 378 ml. of the NaOCl liquor (0.97 mols) and 115 ml. (1.15 mols) of the $H_2SO_4$ were used.

The finished product was filtered on a coarse fritted filter, washed with 30 ml. of ice water and vacuum dried 1.5 hours at 110° C. The resulting trichlorocyanuric acid weighed 65.0 g. (93.3 percent yield) and assayed 90.9 percent available chlorine (99.1 percent of theoretical).

What is claimed is:

1. The method of preparing chlorocyanuric acid which comprises reacting simultaneously
    (1) an aqueous slurry of cyanuric acid
    (2) an aqueous solution of a hypochlorite selected from the group consisting of alkali metal hypochlorites and alkaline earth metal hypochlorites and
    (3) an aqueous acid stronger than hypochlorous acid, maintaining a pH below 5 in the resulting aqueous mixture, and recovering the chlorocyanuric acid produced thereby.

2. The method of claim 1 wherein the pH of said aqueous mixture is maintained from 2.5 to 4.5.

3. The method of claim 1 wherein the temperature of said aqueous mixture is maintained below 40° C.

4. The method of claim 3 wherein the temperature of said aqueous mixture is maintained in the range from 5 to 25° C.

5. The method of claim 1 wherein said hypochlorite is sodium hypochlorite.

6. The method of claim 5 wherein said aqueous solution of hypochlorite has a concentration of sodium hypochlorite ranging from 50 to 250 grams per liter.

7. The method of claim 1 wherein said acid is sulfuric acid.

8. The method of claim 1 wherein the molar ratio of said hypochlorite to said cyanuric acid ranges from 1.8:1 to 2.2:1 and said chlorocyanuric acid is dichlorocyanuric acid.

9. The method of claim 1 wherein the molar ratio of said hypochlorite to said cyanuric acid ranges from 2.8:1 to 3.2:1 and said chlorocyanuric acid is trichlorocyanuric acid.

References Cited
UNITED STATES PATENTS

| | | | |
|---|---|---|---|
| 3,668,204 | 6/1972 | Mesiah | 260—248 |
| 3,712,891 | 1/1973 | Berkowitz et al. | 260—248 |

JOHN M. FORD, Primary Examiner